United States Patent
Saito et al.

(10) Patent No.: US 6,639,027 B2
(45) Date of Patent: Oct. 28, 2003

(54) PRODUCTION PROCESS FOR VINYL-BASED POLYMER

(75) Inventors: Ryuichi Saito, Maebashi (JP); Tadashi Amano, Kashima-gun (JP); Toshihiko Kawakubo, Lake Jackson, TX (US)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/319,550

(22) Filed: Dec. 16, 2002

(65) Prior Publication Data

US 2003/0153696 A1 Aug. 14, 2003

(30) Foreign Application Priority Data

Dec. 21, 2001 (JP) ........................................ 2001-389246

(51) Int. Cl.$^7$ .................................................. C08F 2/42
(52) U.S. Cl. ........................... 526/82; 526/84; 526/319; 526/317.1; 526/330; 526/291; 526/343; 526/344.1; 526/344; 526/910; 526/911; 526/346; 526/329.2
(58) Field of Search ............................. 526/82, 84, 319, 526/317.1, 330, 291, 343, 344.1, 344, 910, 911, 346, 329.2

(56) References Cited

U.S. PATENT DOCUMENTS 4,477,638 A * 10/1984 Reid ........................... 526/84
6,433,074 B1     8/2002 Ooura et al.

* cited by examiner

Primary Examiner—David W. Wu
Assistant Examiner—William Cheung
(74) Attorney, Agent, or Firm—Oblon, Spivak, McClelland, Maier & Neustadt, P.C.

(57) ABSTRACT

A production process for a vinyl-based polymer is provided. The production process comprises a step for polymerizing a vinyl-based monomer by a radical reaction within an aqueous medium in a polymerization vessel, and a step for supplying a reaction inhibitor with a melting point of no more than 40° C. from a reaction inhibitor supply tank to the polymerization vessel via a reaction inhibitor supply pipe. The reaction inhibitor supply tank and the reaction inhibitor supply pipe are heated, and the reaction inhibitor is added to the polymerization vessel in a liquid state with a viscosity of no more than 200 mPa·s. The reaction inhibitor can be added to the polymerization mixture without the use of an organic solvent even at low temperatures, and problems such as the solidification of the reaction inhibitor inside the supply tank or piping, and subsequent blocking of the piping do not occur.

14 Claims, No Drawings

PRODUCTION PROCESS FOR VINYL-BASED POLYMER

BACKGROUND OF THE INVENTION

1. Field of the Invention

The present invention relates to a production process for a vinyl-based polymer, and more specifically to a production process for polymerizing a vinyl-based monomer by a radical reaction with a characteristic method of adding a reaction inhibitor.

2. Description of the Prior Art

In conventional radical polymerization reactions of vinyl-based monomers, reaction inhibitors (also known as reaction retardants or reaction suppressants) have typically been added to the polymerization mixture. Examples of known reaction inhibitors include phenol-based compounds, sulfur compounds, N-oxide compounds, phosphorus compounds, and unsaturated hydrocarbon compounds. Specific examples of the phenol-based compounds include 2,2-di-(4'-hydroxyphenyl)propane, hydroquinone, p-methoxyphenol, t-butylhydroxyanisole, n-octadecyl-3-(4-hydroxy-3,5-di-t-butylphenyl) propionate, t-butylhydroquinone, 2,5-di-t-butylhydroquinone, 4,4'-butylidenebis-(3-methyl-6-t-butyl) phenol, 3,5-di-t-butyl-4-hydroxytoluene, 2,2'-methylene-bis-(4-ethyl-6-t-butyl)phenol, triethyleneglycol-bis [3-(3-t-butyl-5-methyl-4-hydroxyphenyl)propionate], pentaerythrityl-tetrakis [3-(3,5-di-t-butyl-4-hydroxyphenol) propionate], t-butylcatechol, 4,4'-thiobis-(6-t-butyl)-m-cresol, and tocopherol.

The addition of these reaction inhibitors is performed for a variety of reasons, and they may be added to the polymerization mixture prior to commencement of the polymerization reaction in order to reduce the occurrence of fish eyes within the product polymer (Japanese Laid-open publication (kokai) No. 48-49990 (JP48-49990A), Japanese Post-Examination Publication (kokoku) No. 60-50366 (JP60-50366B)), added during the polymerization reaction in order to suppress heat kick, or alternatively added at the completion of the polymerization reaction in order to prevent postpolymerization and prevent deterioration in the anti-initial discoloration property resulting from heat history (U.S. Pat. No. 3,642,756, Japanese Laid-open publication (kokai) No. 57-185302 (JP57-185302A), and Japanese Laid-open publication (kokai) No. 62-503 (JP62-503A)). Furthermore, such reaction inhibitors are also used for halting rapid reactions which occur during abnormal reactions.

Amongst the above reaction inhibitors, 2,2-di-(4'-hydroxyphenyl)propane displays particularly suitable reaction inhibiting properties, enables the production of high quality polymers, and also produces very little adhesion of scale to the polymerization vessel, and has consequently been widely used at the completion of polymerization reactions. However, 2,2-di-(4'-hydroxyphenyl)propane is a solid at room temperature, and unless the material is dissolved in an organic solvent such as methanol prior to use, then the operation of supplying the reaction inhibitor to the reaction vessel via a supply pipe is problematic. However, because this method requires the use of an organic solvent, not only are there associated physical dangers for the operators exposed to the fumes, but these fumes also become a source of potential environmental pollution.

Consequently, in Japanese Post-Examination publication (kokoku) No. 7-113041 (JP7-113041B), a reaction inhibitor represented by a general formula (1) shown below was disclosed as a potential alternative to 2,2-di-(4'-hydroxyphenyl)propane.

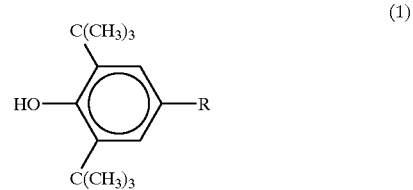

(1)

(wherein, R represents an alkyl group of 3 or more carbon atoms). Specifically, the compound in which the R group is a sec-butyl group, namely, 2,6-di-t-butyl-4-sec-butylphenol is currently used. This compound exists as a liquid in the supply tank and piping when the external air temperature is between 20 and 25° C., namely room temperature, and so is able to be supplied to the polymerization vessel via the supply piping without requiring the use of a solvent. Furthermore, 2,4-dimethyl-6-(1-methylpentadecyl)phenol and 2,6-di-tert-butyl-4-nonylphenol are also liquids at room temperature, and can also be supplied to a polymerization vessel without the use of a solvent.

However, these type of reaction inhibitors also suffer problems if the external air temperature drops below normal room temperatures. For example, if 2,6-di-tert-butyl-4-sec-butylphenol is used, then because the melting point is from 18 to 20° C., in cases in which the external temperature is low, namely 10° C. or lower, the compound enters a super-cooled state, and as a result, the reaction inhibitor is more likely to solidify, thereby blocking the supply piping. In a worst possible case, the reaction inhibitor may solidify inside the storage tank, making the supply operation itself impossible. In addition, in the case of other reaction inhibitors with lower melting points, such as 2,6-di-tert-butyl-4-nonylphenol, the viscosity at 20° C. is approximately 400 mPa·s, and this viscosity exceeds 1000 mPa·s under cooling, which can make the supply operation extremely difficult. Consequently, an organic solvent such as methanol must be used to dissolve the reaction inhibitor, and so these types of reaction inhibitors do not completely resolve the aforementioned problems of physical danger for the operators and environmental pollution.

Furthermore, methods in which a dispersion such as an emulsion or a suspension is first prepared by using a dispersant such as an emulsifier or a suspension agent to disperse the above type of reaction inhibitor in an aqueous medium, and this dispersion is then added to the polymerization mixture can also be effective, although the viscosity of the dispersion may increase markedly, making the operation of supplying the dispersion through the supply piping to the polymerization vessel extremely difficult. Moreover, if the external temperature is less than 0C, then there is a danger of the dispersion solidifying.

In addition, in those cases where cold temperatures result in the reaction inhibitor solidifying and blocking the supply piping, a device for heating the blocked sections to melt the solidified reaction inhibitor and prevent blocking of the piping can be installed, although the heating operation is complex, and not only does melting the reaction inhibitor take considerable time, but there is also some danger associated with the heating process.

SUMMARY OF THE INVENTION

The present invention takes the above factors in consideration, with an object of providing a production process for a vinyl-based polymer in which a reaction inhibitor can be added to a polymerization mixture without the use of an organic solvent, even at low temperatures, and problems such as the solidification of the reaction inhibitor inside the supply tank or piping, and subsequent blocking of the piping do not occur.

As a result of intensive investigations aimed at resolving the above problems, the inventors of the present invention discovered that by heating the reaction inhibitor supply tank and the reaction inhibitor supply piping, and maintaining the reaction inhibitor, with a melting point of no more than 40° C., in a liquid form with a viscosity below a specified level, problems such as the blocking of the supply piping due to solidification of the reaction inhibitor could be resolved, and the inventors were consequently able to complete the present invention.

In other words, the present invention provides a production process for a vinyl-based polymer comprising:

a step for polymerizing a vinyl-based monomer by a radical reaction within an aqueous medium in a polymerization vessel; and a step for supplying a reaction inhibitor with a melting point of no more than 40° C. from a reaction inhibitor supply tank to the polymerization vessel via a reaction inhibitor supply pipe;

wherein the reaction inhibitor supply tank and the reaction inhibitor supply pipe are heated, and the reaction inhibitor is added to the polymerization vessel in a liquid state with a viscosity of no more than 200 mPa·s without using an organic solvent.

DESCRIPTION OF THE PREFERRED EMBODIMENTS

As follows is a more detailed description of the present invention.

In the present invention, a reaction inhibitor with a melting point of no more than 40° C. is maintained at a temperature above the melting point by heating the reaction inhibitor supply tank and the supply piping, and the reaction inhibitor is added to the polymerization mixture in a liquid state with a viscosity of no more than 200 mPa·s, and preferably no more than 50 mPa·s. If the viscosity of the reaction inhibitor exceeds 200 mPa·s, then not only is the reaction inhibitor more likely to adhere to the reaction inhibitor supply piping, making the supply of an accurate quantity of the inhibitor difficult, but when heating of the piping is halted and the piping cools, there is a danger of this adhered product solidifying and blocking the supply piping.

In cases in which the reaction inhibitor is in a supercooled state, namely a state in which the reaction inhibitor remains in a liquid state despite being cooled below melting point, the reaction inhibitor is far more likely to solidify. For example, if the reaction inhibitor is 2,6-di-tert-butyl-4-sec-butylphenol, which has a melting point of 18 to 20° C., then at external air temperatures below 20° C., solidification occurs. However, if the present invention is employed and the reaction inhibitor is added to the polymerization vessel in a liquid state with a viscosity maintained at no more than 200 mPa·s, then even if the external air temperature is low, the reaction inhibitor inside the supply tank and the supply piping is maintained at a temperature above the melting point. In addition, because the viscosity of the reaction inhibitor is low, the addition operation becomes a simpler operation. Accordingly, the reaction inhibitor can be added to the polymerization mixture without the use of an organic solvent such as methanol or toluene, and without blocking the reaction inhibitor supply piping between the reaction inhibitor supply tank and the polymerization vessel, even at low temperatures.

Heating of the reaction inhibitor supply tank and the reaction inhibitor supply piping is performed using a method such as that described below. There are no particular restrictions on the heating method employed, although typically heating is performed by passing hot water or steam through a jacket fitted to the polymerization vessel and the piping.

Heating of the supply tank must be performed when the external air temperature falls below the melting point of the reaction inhibitor, and particularly if the external air temperature falls to a temperature more than 10° C. below the melting point, hot water must be passed through the jacket to maintain the temperature of the reaction inhibitor inside the supply tank and the supply piping at a value within a range from T° C. to 60° C. (where T° C. represents the melting point of the reaction inhibitor), and preferably from (T+5)° C. to 60° C., and even more preferably from (T+5)° C. to (T+20)° C. If the temperature of the reaction inhibitor inside the supply tank is lower than the melting point, then there is a danger of the reaction inhibitor solidifying inside the tank. In contrast, if the temperature of the reaction inhibitor inside the supply tank exceeds 60° C., then there is a danger that long term storage of the reaction inhibitor will result in deterioration and coloration of the inhibitor due to oxidation, causing coloration of the product polymer.

The reaction inhibitor supply tank and supply piping should preferably be maintained at a temperature within a range from 40 to 170° C. using, e.g., a jacket provided on the outside thereof, and even more preferably from 70 to 140° C. There are no particular restrictions on the heating method used to ensure maintenance of the temperature at this level, and hot water or steam heated to a temperature between 40 and 170° C. can be used. The supply tank region should preferably be heated using hot water between 40 and 80° C., and the supply piping heated using steam at a temperature between 100 and 150° C. If the heating temperature is less than 40° C., then the solidification prevention effect on the reaction inhibitor is inadequate. In contrast, if the heating temperature exceeds 170° C., then the reaction inhibitor becomes susceptible to oxidation, and there is danger of anti-oxidant coloring appearing, resulting in coloring of the product polymer.

Moreover, the heating should preferably be performed on the entire region from the reaction inhibitor supply tank through to the polymerization vessel, including the reaction inhibitor meter and the reaction inhibitor supply piping. If sections of the supply piping are not heated, then these sections are cooled by the external air, meaning not only will the viscosity of the reaction inhibitor increase, making the supply operation more difficult, but the danger arises of the reaction inhibitor falling to a temperature below the melting point, and solidifying and blocking the supply piping.

In the present invention, a reaction inhibitor with a melting point of no more than 40° C. is used. Examples of preferred reaction inhibitors include those represented by a general formula (1) shown below,

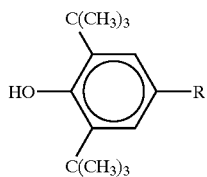

(1)

(wherein, R represents an alkyl group of 3 or more carbon atoms), as well as 2,4-dimethyl-6-(1-methylpentadecyl) phenol (melting point 15° C.).

Specific examples of the reaction inhibitor represented by the general formula (1) include 2,6-di-tert-butyl-4-sec-butylphenol (melting point 20° C.), 2,6-di-tert-butyl-4-nonylphenol (melting point −40° C.).

Examples of particularly preferred reaction inhibitors with melting points of no more than 40° C. include 2,6-di-tert-butyl-4-sec-butylphenol, 2,6-di-tert-butyl-4-nonylphenol, and 2,4-dimethyl-6-(1-methylpentadecyl) phenol (melting point 15° C.).

Depending on the effect desired, the reaction inhibitor is added to the polymerization mixture during at least one of three stages, namely, prior to commencement of the polymerization reaction, during the polymerization reaction, or at the completion of the polymerization reaction. The quantity of the reaction inhibitor added is typically within a range from 0.0005 to 0.5 parts by weight per 100 parts by weight of the vinyl-based monomer. Specifically, in those cases in which the reaction inhibitor is added prior to commencement of the polymerization reaction in order to reduce the occurrence of fish eyes within the product polymer, the quantity of the reaction inhibitor should preferably be within a range from 0.0005 to 0.005 parts by weight per 100 parts by weight of the vinyl-based monomer. In such cases, heating the aqueous medium prior to the addition is an effective method. In those cases in which the reaction inhibitor is added at the completion of the polymerization reaction once a predetermined rate of polymerization conversion has been reached, in order to prevent any subsequent postpolymerization, the quantity of the reaction inhibitor should preferably be within a range from 0.005 to 0.05 parts by weight per 100 parts by weight of the vinyl-based monomer. In addition, in those cases in which a reaction inhibitor of the present invention is added to the polymerization mixture in order to immediately and completely halt the suspension polymerization reaction, the quantity of the reaction inhibitor should preferably be within a range from 0.2 to 0.5 parts by weight per 100 parts by weight of the added vinyl-based monomer.

In a production process for a vinyl-based polymer according to the present invention, suitable examples of the vinyl-based monomer include halogenated vinyl or halogenated vinylidene compounds such as vinyl chloride, vinyl bromide and vinylidene chloride; polymerizable olefin-based monomers with at least one terminal $CH_2=C<$ group including acrylate esters such as methyl acrylate, ethyl acrylate, butyl acrylate, octyl acrylate and cyanoethyl acrylate; vinyl acetate; methacrylate esters such as methyl methacrylate and butyl methacrylate; styrene and styrene derivatives such as α-methylstyrene, vinyltoluene and chlorostyrene; vinylnaphthalene; diolefins such as butadiene, isoprene and chloroprene; as well as mixtures of the above monomers with other copolymerizable olefin monomers; and other known polymerizable olefin monomers.

A production process for a vinyl-based polymer according to the present invention can be applied to any type of vinyl-based monomer radical polymerization reaction, regardless of form, including suspension polymerization, emulsion polymerization, bulk polymerization and microsuspension polymerization.

As follows is a description of a vinyl-based polymer production process of the present invention, in the case of a suspension polymerization.

Suspension polymerization is carried out in an aqueous medium, in the presence of a known polymerization initiator and a dispersant, and typically at a temperature between 0 and 100° C., with temperatures from 30 to 70° C. being particularly preferred. There are no particular restrictions on the dispersant and the polymerization initiator used, and compounds used in conventional vinyl-based monomer polymerization reactions are suitable. Specific examples of the dispersant include water soluble cellulose ether compounds such as methyl cellulose, hydroxyethyl cellulose, hydroxypropyl cellulose and hydroxypropylmethyl cellulose, water soluble or oil soluble partially saponified polyvinyl alcohols, water soluble polymers such as acrylic acid polymers and gelatin, oil soluble emulsifiers such as sorbitan monolaurate, sorbitan trioleate, glycerin tristearate, and block copolymers of ethylene oxide and propylene oxide, and water soluble emulsifiers such as polyoxyethylene sorbitan monolaurate, polyoxyethylene glycerin oleate and sodium laurate, and these dispersants may be used singularly, or in combinations of two or more different dispersants. There are no particular restrictions on the amount of dispersant added, although typically from 0.01 to 5 parts by weight of the dispersant is used per 100 parts by weight of the monomer.

Examples of the polymerization initiator include percarbonate compounds such as diisopropyl peroxydicarbonate, di-2-ethylhexyl peroxydicarbonate and diethoxyethyl peroxydicarbonate, perester compounds such as t-butyl peroxyneodecanoate, t-butyl peroxypivalate, t-hexyl peroxypivalate, α-cumyl peroxyneodecanoate and 2,4,4-trimethylpentyl-2-peroxy-2-neodecanoate, peroxides such as acetyl cyclohexylsulfonyl peroxide, 2,4,4-trimethylpentyl-2-peroxyphenoxy acetate, 3,5,5-trimethylhexanoyl peroxide and isobutyryl peroxide, and azo compounds such as azobis-2,4-dimethylvaleronitrile, azobis(4-methoxy)-2,4-dimethylvaleronitrile, as well as ammonium persulfate and hydrogen peroxide and the like, and these polymerization initiators may be used singularly, or in combinations of two or more different initiators. There are no particular restrictions on the amount of polymerization initiator added, although typically from 0.01 to 1 part by weight of the polymerization initiator is used per 100 parts by weight of the monomer.

In term of other conditions associated with the suspension polymerization, there are no particular restrictions on factors such as the method of supplying the aqueous medium to the polymerization vessel and performing degassing, the method of supplying the vinyl monomer, other comonomers if required, the dispersant and the polymerization initiator, or the relative proportions of the above constituents, and typical conditions are suitable. Moreover, where necessary, other additives typically used in the polymerization of vinyl-based monomers such as polymerization degree regulators, chain transfer agents, pH regulating agents, gelation modifiers, antistatic agents, antioxidants and scale adhesion prevention agents may also be added to the polymerization mixture.

EXAMPLES

As follows is a more specific description of the present invention, based on a series of examples and comparative examples, although the present invention is in no way limited to the examples presented.

In the examples and the comparative examples, the viscosity and melting point values for the reaction inhibitors were measured using the methods described below.
Reaction Inhibitor Viscosity:

580 ml of the reaction inhibitor (at 20° C.) was used to fill a cylindrical vessel of diameter 5 cm, and the viscosity was measured using a B-type viscometer. The viscometer spindle rotation was set to 60 rpm.
Reaction Inhibitor Melting Point:

Melting points were measured using a melting point measurement device in which a sample of the solid reaction inhibitor was packed in a capillary tube and heated in a heated liquid, with the melting point being determined by visual observation.

Example 1

A reaction vessel equipped with a stirrer and a jacket and with an internal capacity of 2000 L was used. A tank with a fitted jacket was used for the reaction inhibitor supply tank. Piping with a jacket fitted around the exterior of the piping was used for the reaction inhibitor supply piping.

Reaction inhibitor supply piping connected the polymerization vessel to the reaction inhibitor supply tank, so that the reaction inhibitor stored in the reaction inhibitor supply tank could be supplied to the polymerization vessel through the reaction inhibitor supply piping.

With the external air temperature at 5° C., a polyvinyl chloride was produced in the manner described below.

In the 2000 L capacity polymerization vessel equipped with a stirrer and a jacket were placed 800 kg of deionized water, and a dispersant mixture containing 165 g of a partially saponified polyvinyl alcohol with a saponification ratio of 80% and an average degree of polymerization of 2000, 45 g of a partially saponified polyvinyl alcohol with a saponification ratio of 48% and an average degree of polymerization of 250, and 80 g of a hydroxypropylmethyl cellulose with a methoxy substitution ratio of 29%, a hydroxypropoxy substitution ratio of 9% and a viscosity at 20° C. for a 2% by weight aqueous solution thereof of 49.5 mPa·s. Subsequently, the inside of the polymerization vessel was degassed until the internal pressure reached 0.013 MPa, and 720 kg of vinyl chloride monomer was added. With the mixture undergoing constant stirring, 270 g of diethylhexyl peroxydicarbonate, 160 g of t-butyl peroxyneodecanoate and 30 g of cumyl peroxyneodecanoate were then combined with the reaction mixture, while the temperature was raised to 57° C. by passing hot water through the jacket. The polymerization was then allowed to progress with the temperature maintained at this level.

In addition, warm water was passed continuously through the jacket fitted around the reaction inhibitor supply tank, in order to maintain the temperature of the reaction inhibitor inside the tank at 25° C., namely a reaction inhibitor viscosity of 60 mPa·s.

The reaction inhibitor supply piping was preheated by passing hot water at a temperature of 80° C. through the jacket of the reaction inhibitor supply piping, and when the internal pressure of the polymerization vessel had fallen to 0.6 MPa, 100 g of 2,6-di-t-butyl-4-sec-butylphenol at 20° C. (viscosity 90 mPa·s) from the supply tank was added to the reaction mixture via the supply piping as a reaction inhibitor. Following subsequent recovery of any unreacted monomer, the reaction mixture slurry was removed from the polymerization vessel and dewatered in a centrifuge. The thus obtained dewatered cake was then dried for 3 hours at 70° C. in a batch fluidized drying device to yield a product polymer.

During this process, no solid adhesion or blockages were observed within the reaction inhibitor supply piping.

Example 2

With the external air temperature at 5° C., polymerization of the vinyl chloride monomer and storage of the reaction inhibitor was conducted in the same manner as that described for the example 1.

The reaction inhibitor supply piping was preheated by passing steam at a temperature of 140° C. through the jacket of the reaction inhibitor supply piping, and when the internal pressure of the polymerization vessel had fallen to 0.6 MPa, 100 g of 2,6-di-t-butyl-4-sec-butylphenol at 25° C. (viscosity 60 mPa·s) from the supply tank was added to the reaction mixture via the supply piping as a reaction inhibitor, and a product polymer was then produced in the same manner as the example 1.

During this process, no solid adhesion or blockages were observed within the reaction inhibitor supply piping.

Example 3

With the external air temperature at 5° C., a polyvinyl chloride was produced in the manner described below.

In a 2000 L capacity polymerization vessel equipped with a stirrer and a jacket were placed 950 kg of deionized water, and a dispersant mixture containing 110 g of a partially saponified polyvinyl alcohol with a saponification ratio of 80% and an average degree of polymerization of 2000, 50 g of a partially saponified polyvinyl alcohol with a saponification ratio of 48% and an average degree of polymerization of 250, and 160 g of the same hydroxypropylmethyl cellulose as that used in the example 1. Subsequently, the inside of the polymerization vessel was degassed until the internal pressure reached 0.013 MPa, and 640 kg of vinyl chloride monomer was added. With the mixture undergoing constant stirring, 500 g of t-butyl peroxyneodecanoate and 150 g of cumyl peroxyneodecanoate were then combined with the reaction mixture, while the temperature was raised to 52° C. by passing hot water through the jacket. The polymerization was then allowed to progress with the temperature maintained at this level.

In addition, storage of the reaction inhibitor was performed in the same manner as the example 1.

The reaction inhibitor supply piping was preheated by passing hot water at a temperature of 80° C. through the jacket of the reaction inhibitor supply piping, and when the internal pressure of the polymerization vessel had fallen to 0.6 MPa, 80 g of 2,6-di-t-butyl-4-sec-butylphenol at 20° C. (viscosity 90 mPa·s) from the supply tank was added to the reaction mixture via the supply piping as a reaction inhibitor, and a polymer was then produced in the same manner as the example 1.

During this process, no solid adhesion or blockages were observed within the reaction inhibitor supply piping.

Example 4

With the external air temperature at 5° C., polymerization of the vinyl chloride monomer was conducted in the same manner as that described for the example 3.

The reaction inhibitor supply piping was preheated by passing steam at a temperature of 140° C. through the jacket of the reaction inhibitor supply piping, and when the internal pressure of the polymerization vessel had fallen to 0.6 MPa, 80 g of 2,6-di-t-butyl-4-sec-butylphenol at 25° C. (viscosity 60 mPa·s) from the heated supply tank was added to the reaction mixture via the supply piping as a reaction inhibitor, and a product polymer was then produced in the same manner as the example 1.

During this process, no solid adhesion or blockages were observed within the reaction inhibitor supply piping.

Comparative Example 1

A methanol solution of 2,6-di-t-butyl-4-sec-butylphenol obtained by diluting 200 g of 2,6-di-t-butyl-4-sec-butylphenol at 20° C. with 1000 g of methanol was placed in the reaction inhibitor supply tank, and storage of the reaction inhibitor was performed without heating.

With the external air temperature at 5° C., polymerization of a vinyl chloride monomer was conducted in the same manner as the example 1, but without heating the reaction inhibitor supply tank or the reaction inhibitor supply piping. When the internal pressure of the polymerization vessel had fallen to 0.6 MPa, 600 g of the methanol solution of 2,6-di-t-butyl-4-sec-butylphenol at 5° C. from the reaction inhibitor supply tank was added to the reaction mixture via the reaction inhibitor supply piping, and a product polymer was then produced in the same manner as the example 1.

Comparative Example 2

With the external air temperature at 5° C., polymerization of a vinyl chloride monomer and storage of the reaction inhibitor were conducted in the same manner as the example 1. When the internal pressure of the polymerization vessel had fallen to 0.6 MPa, an attempt was made to add 100 g of 2,6-di-t-butyl-4-sec-butylphenol from the heated supply tank to the reaction mixture via the reaction inhibitor supply piping, without heating the reaction inhibitor supply piping, but during the addition the 2,6-di-t-butyl-4-sec-butylphenol solidified, blocking the supply piping and making addition of the entire quantity of the reaction inhibitor impossible. Following subsequent recovery of any unreacted monomer, a product polymer was then produced in the same manner as the example 1.

Comparative Example 3

With the external air temperature at 5° C., the reaction inhibitor supply tank was left unheated. Polymerization of a vinyl chloride monomer was conducted in the same manner as the example 1, and when the internal pressure of the polymerization vessel had fallen to 0.6 MPa, an attempt was made to add 2,6-di-t-butyl-4-sec-butylphenol from the supply tank to the reaction mixture as a reaction inhibitor, but the 2,6-di-t-butyl-4-sec-butylphenol had already solidified inside the supply tank, and addition to the polymerization mixture was impossible. Following subsequent recovery of any unreacted monomer, a product polymer was then produced in the same manner as the example 1.

Comparative Example 4

A methanol solution of 2,6-di-t-butyl-4-sec-butylphenol obtained by diluting 160 g of 2,6-di-t-butyl-4-sec-butylphenol at 20° C. with 800 g of methanol was placed in the reaction inhibitor supply tank, and storage of the reaction inhibitor was performed without heating.

With the external air temperature at 5° C., polymerization of a vinyl chloride monomer was conducted in the same manner as the example 3, but without heating the reaction inhibitor supply tank or the reaction inhibitor supply piping. When the internal pressure of the polymerization vessel had fallen to 0.6 MPa, 480 g of the methanol solution of 2,6-di-t-butyl-4-sec-butylphenol at 5° C. from the reaction inhibitor supply tank was added to the reaction mixture via the reaction inhibitor supply piping, and a product polymer was then produced in the same manner as the example 1.

Comparative Example 5

With the external air temperature at approximately 5° C., polymerization of a vinyl chloride monomer and storage of the reaction inhibitor were conducted in the same manner as the example 3. When the internal pressure of the polymerization vessel had fallen to 0.6 MPa, an attempt was made to add 80 g of 2,6-di-t-butyl-4-sec-butylphenol from the heated supply tank to the reaction mixture via the reaction inhibitor supply piping, without heating the reaction inhibitor supply piping, but during the addition the 2,6-di-t-butyl-4-sec-butylphenol solidified, blocking the supply piping and making addition of the entire quantity of the reaction inhibitor impossible. Following subsequent recovery of any unreacted monomer, a product polymer was then produced in the same manner as the example 1.

Comparative Example 6

With the external air temperature at approximately 5° C., the reaction inhibitor supply tank was left unheated. Polymerization of a vinyl chloride monomer was conducted in the same manner as the example 3, and when the internal pressure of the polymerization vessel had fallen to 0.6 MPa, an attempt was made to add 2,6-di-t-butyl-4-sec-butylphenol from the supply tank to the reaction mixture as a reaction inhibitor, but the 2,6-di-t-butyl-4-sec-butylphenol had already solidified inside the supply tank, and addition to the polymerization mixture was impossible. Following subsequent recovery of any unreacted monomer, a product polymer was then produced in the same manner as the example 1.

The physical properties and characteristics of each of the products were evaluated using the methods described below. The evaluation results are shown in Table 1 and Table 2.

Bulk Specific Gravity

This property was measured in accordance with JIS K-6721.

Plasticizer Absorption Quantity

Glass fiber was placed in the bottom of an aluminum alloy vessel of internal diameter 25 mm and depth 85 mm, and 10 g of a sample resin was then placed in the vessel. 15 cc of DOP (dioctyl phthalate) was then added, and the vessel was left to stand for 30 minutes to allow the DOP sufficient time to penetrate. Subsequently, excess DOP was removed by centrifuging at an acceleration of 1500 G, the amount of DOP adsorbed onto the resin was determined, and this amount was then presented as an absorption quantity per 100 g of resin.

Plasticizer Absorptivity 400 g of a vinyl chloride polymer was fed into a Plasti-Corder planetary mixer (manufactured by Brabender Corporation) (jacket temperature: 83° C.), the polymer was heated for 4 minutes with continuous kneading at 60 rpm, and 200 g of DOP was then added. The time taken from the addition of the DOP until the kneading torque of the planetary mixer reached a minimum was measured as the "dry-up" time, and this time was used as an indicator of the plasticizer absorptivity.

Anti-initial Discoloration 1.5 g of a tin-based stabilizer and 50 g of DOP were combined with 100 g of a vinyl chloride polymer, and following kneading of the mixture for 5 minutes at 160° C. using a twin roll mill, a sheet of thickness 0.8 mm was formed.

This sheet was subsequently cut and overlapped, placed inside a molding frame of dimensions 4×4×1.5 cm, and then pressure molded at a temperature of 160° C. and a pressure of 6.5 to 7 MPa to form a test sample. This test sample was then analyzed using a photoelectric calorimeter (manufactured by Nippon Denshoku Co., Ltd.) and the value of the psychometric lightness L in the Hunter's color difference formula disclosed in JIS-Z8730 (1980) was determined, and the values of the psychometric chroma coordinates a and b were measured.

The anti-discoloration property of the polymer was then evaluated based on these measured results, and each evaluation was recorded in Table 1 or Table 2 using the following encoding.

Good: O
Marginal: Δ
Unsatisfactory: X

Roll Fish Eye

| [Composition] | Product polymer | 100 g |
| | Tin stabilizer | 2.2 g |
| | Pigment | 0.6 g |
| | Lubricant | 0.8 g |
| | DOP | 50 g |

A mixture prepared with the above composition was kneaded for 5 minutes at 140° C. using a six-inch roll mill, and was then formed into a sheet of width 15 cm and thickness 0.22 mm. The number of transparent spots across the entire surface of the sheet was counted, and the total number was recorded as the roll fish eye value.

TABLE 1

| | Example 1 | Example 2 | Comparative Example 1 | Comparative Example 2 | Comparative Example 3 |
|---|---|---|---|---|---|
| Bulk specific gravity (g/cm$^3$) | 0.548 | 0.545 | 0.540 | 0.552 | 0.555 |
| Plasticizer absorption quantity | 26.0 | 26.2 | 25.5 | 24.8 | 24.2 |
| Plasticizer absorption time (minutes) | 13.4 | 13.2 | 13.8 | 14.6 | 15.9 |
| Anti-initial Discoloration (L) | 73.0 | 72.8 | 73.0 | 72.0 | 71.2 |
| (a) | −1.9 | −1.8 | −1.8 | −1.9 | −1.8 |
| (b) | 12.7 | 12.8 | 12.9 | 13.5 | 14.2 |
| Anti-initial Discoloration evaluation | O | O | O | Δ | × |
| Roll fish eyes | 17 | 15 | 20 | 50 | 70 |
| Solvent Use | no | no | yes | no | no |

TABLE 2

| | Example 3 | Example 4 | Comparative Example 4 | Comparative Example 5 | Comparative Example 6 |
|---|---|---|---|---|---|
| Bulk specific gravity (g/cm$^3$) | 0.501 | 0.499 | 0.494 | 0.508 | 0.516 |

TABLE 2-continued

| | Example 3 | Example 4 | Comparative Example 4 | Comparative Example 5 | Comparative Example 6 |
|---|---|---|---|---|---|
| Plasticizer absorption quantity | 30.0 | 30.5 | 29.7 | 28.5 | 26.2 |
| Plasticizer absorption time (minutes) | 11.8 | 11.7 | 12.0 | 12.5 | 13.2 |
| Anti-initial Discoloration (L) | 71.8 | 71.5 | 71.5 | 71.0 | 70.3 |
| (a) | −0.6 | −0.7 | −0.5 | −0.6 | −0.6 |
| (b) | 10.7 | 10.8 | 10.6 | 11.3 | 12.2 |
| Anti-initial Discoloration evaluation | ○ | ○ | ○ | Δ | × |
| Roll fish eyes | 2 | 2 | 3 | 10 | 19 |
| Solvent Use | no | no | yes | no | no |

As is clearly evident from the results in Table 1 and Table 2, according to a production process of the present invention, a reaction inhibitor can be supplied to a polymerization vessel without blocking the outlet of the reaction inhibitor supply tank or the reaction inhibitor supply piping, even in cold temperatures, and in addition, a vinyl chloride-based polymer can be produced which displays a quality which compares favorably with polymers produced by conventional production methods.

According to a production process of the present invention, a vinyl chloride-based polymer of a quality which compares favorably with conventional production processes can be produced without any problems associated with blocking of the outlet of the reaction inhibitor supply tank or the reaction inhibitor supply piping due to solidification of the reaction inhibitor, even if the operation of supplying the reaction inhibitor is conducted at a low temperature. The process of the present invention is particularly effective in the case of an external air temperature of 10° C. or lower. Furthermore, because the process uses no organic solvent, the method is safer for the operators involved, and free of environmental pollution problems.

What is claimed is:

1. A production process for a vinyl-based polymer comprising:
    a step for polymerizing a vinyl-based monomer by a radical reaction within an aqueous medium in a polymerization vessel; and
    a step for supplying a reaction inhibitor with a melting point of no more than 40° C. from a reaction inhibitor supply tank to said polymerization vessel via a reaction inhibitor supply pipe;
    wherein said reaction inhibitor supply tank and said reaction inhibitor supply pipe are heated, and said reaction inhibitor is added to said polymerization vessel in a liquid state with a viscosity of no more than 200 mPa·s without using an organic solvent.

2. The production process according to claim 1, wherein a viscosity of said reaction inhibitor is no more than 50 mPa·s.

3. The production process according to claim 1, wherein said reaction inhibitor supply tank and said reaction inhibitor supply pipe are maintained at a temperature within a range from 40 to 170° C.

4. The production process according to claim 3, wherein said reaction inhibitor supply tank and said reaction inhibitor supply pipe are maintained at a temperature within a range from 70 to 140° C.

5. The production process according to claim 1, wherein a temperature of a reaction inhibitor inside said reaction inhibitor supply tank and said reaction inhibitor supply piping is maintained within a range from T° C. to 60° C. where T° C. represents a melting point of said reaction inhibitor.

6. The production process according to claim 5, wherein a temperature of a reaction inhibitor inside said supply tank and said supply piping is maintained within a range from (T+5)° C. to 60° C. where T° C. represents a melting point of said reaction inhibitor.

7. The production process according to claim 6, wherein a temperature of a reaction inhibitor inside said supply tank is maintained within a range from (T+5)° C. to (T+20)° C. where T° C. represents a melting point of said reaction inhibitor.

8. The production process according to claim 1, wherein said heating is performed across an entire region from said reaction inhibitor supply tank through to said polymerization vessel, including said supply pipe.

9. The production process according to claim 1, wherein said reaction inhibitor with a melting point of no more than 40° C. is selected from the group consisting of compounds represented by a general formula (1) shown below,

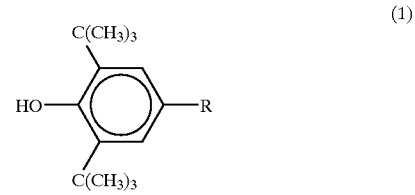

(1)

wherein, R represents an alkyl group of 3 or more carbon atoms, and 2,4-dimethyl-6-(1-methylpentadecyl) phenol with a melting point of 15° C.

10. The production process according to claim 9, wherein said reaction inhibitor with a melting point of no more than 40° C. is selected from the group consisting of 2,6-di-tert-butyl-4-sec-butylphenol, 2,4-dimethyl-6-(1-methylpentadecyl)phenol and 2,6-di-tert-butyl-4-nonylphenol.

11. The production process according to claim 1, wherein depending on an effect desired, said reaction inhibitor is added to a polymerization mixture during at least one of three stages, namely, prior to commencement of polymerization reaction, during polymerization, or at a completion of polymerization, and a quantity of said reaction inhibitor added is within a range from 0.0005 to 0.5 parts by weight per 100 parts by weight of said vinyl-based monomer.

12. The production process according to claim 1, wherein said vinyl-based monomer is a halogenated vinyl compound, a halogenated vinylidene compound, an acrylate ester, a methacrylate ester, vinyl acetate, a styrene-based compound, a diolefin, or a mixture of another copolymerizable olefin monomer therewith.

13. The production process according to claim 12, wherein said vinyl-based monomer is vinyl chloride.

14. The production process according to claim 1, wherein said vinyl-based monomer is polymerized by suspension polymerization, emulsion polymerization, bulk polymerization, or microsuspension polymerization.

* * * * *